(No Model.) 7 Sheets—Sheet 3.
W. A. & F. A. PECK.
CHAIN MACHINE.
No. 543,944. Patented Aug. 6, 1895.
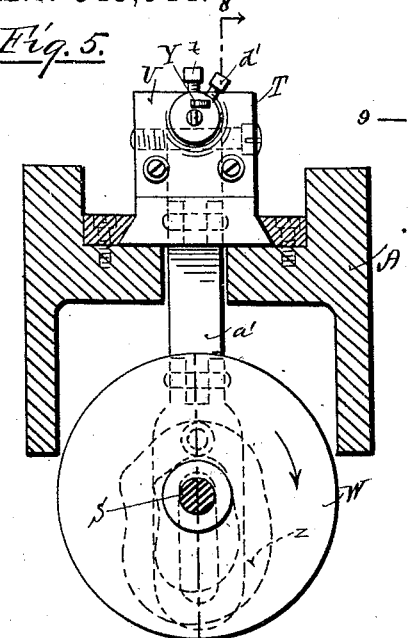
Fig. 5.
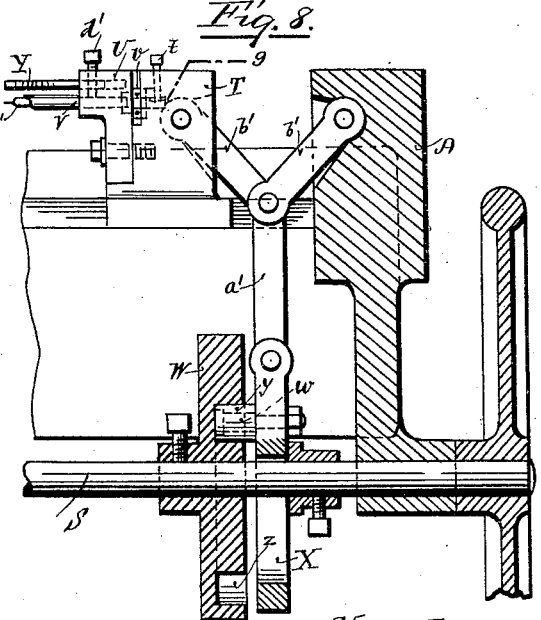
Fig. 8.
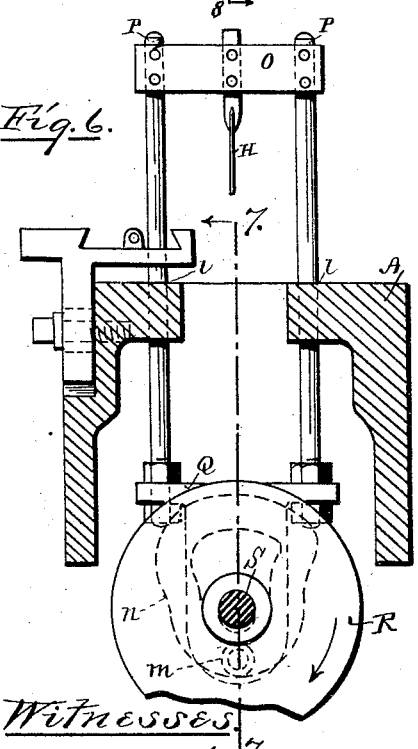
Fig. 6.
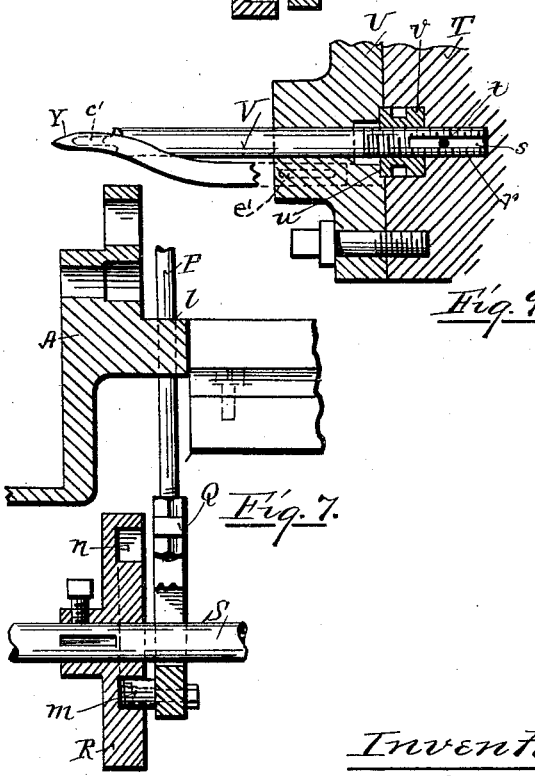
Fig. 9.
Fig. 7.
Witnesses
Charles Hannigan
James W. Brennan
Inventors
William A. Peck
Frederick A. Peck
By S. Scholfield
Atty.

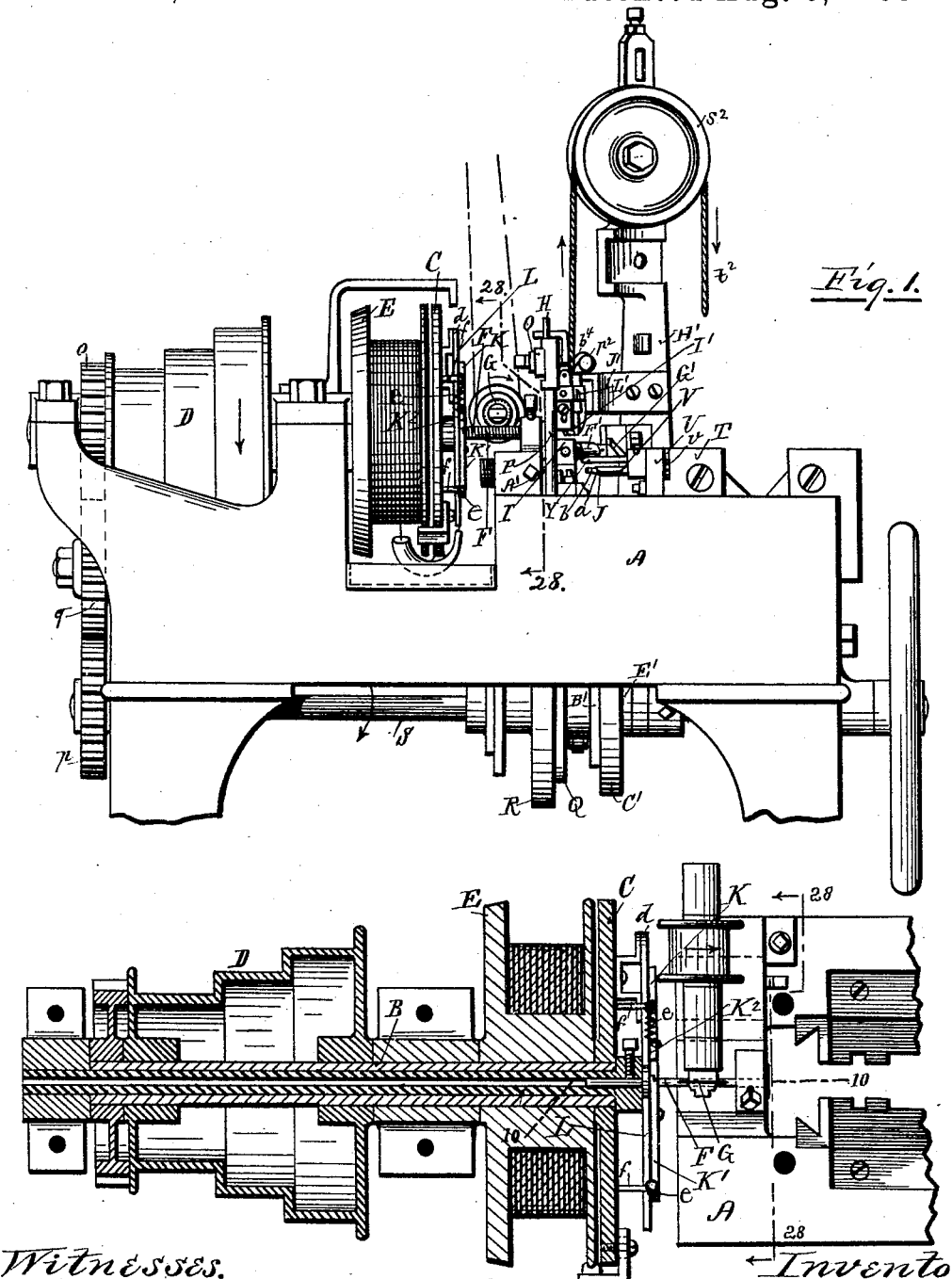

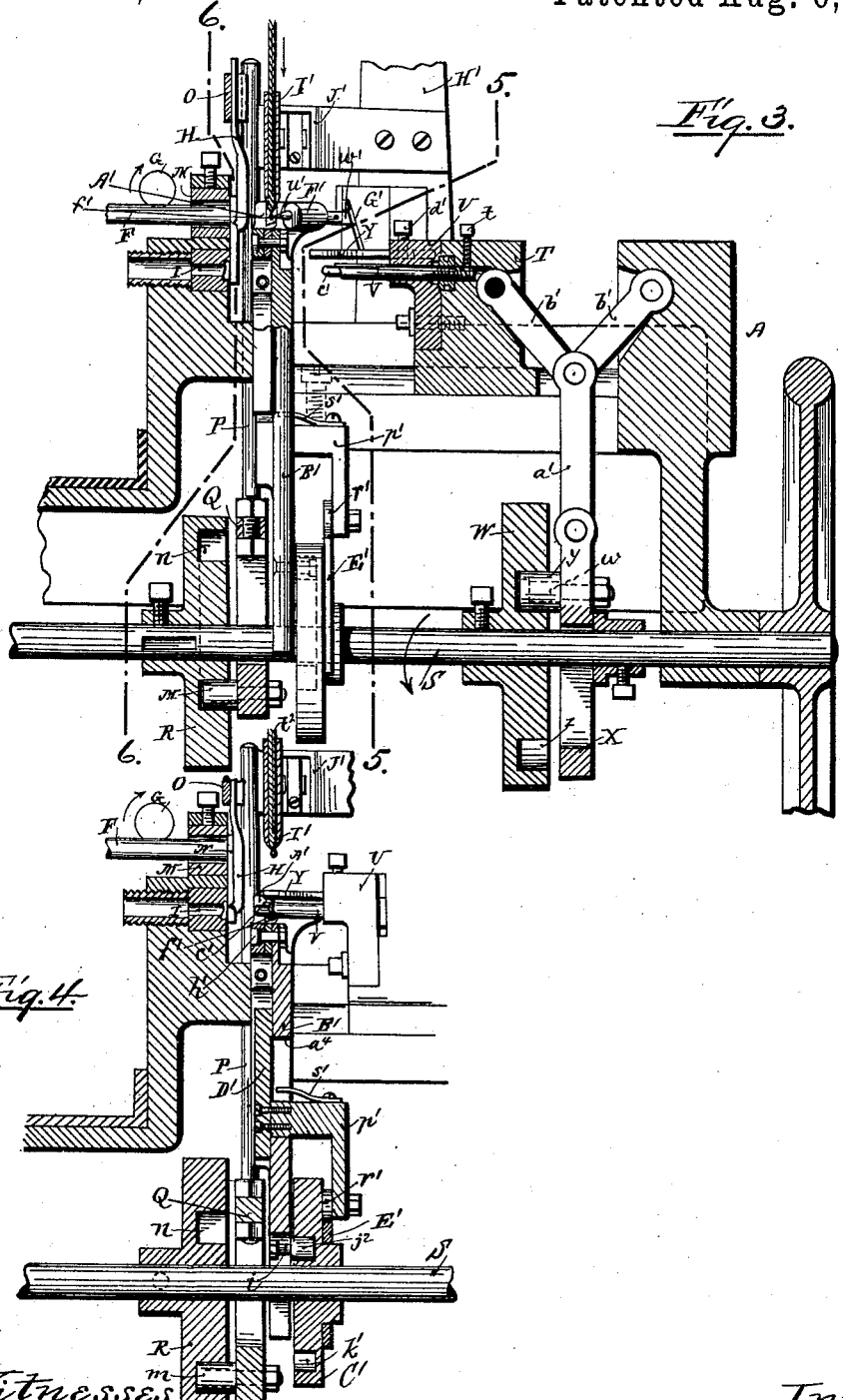

(No Model.) 7 Sheets—Sheet 4.
W. A. & F. A. PECK.
CHAIN MACHINE.
No. 543,944. Patented Aug. 6, 1895.
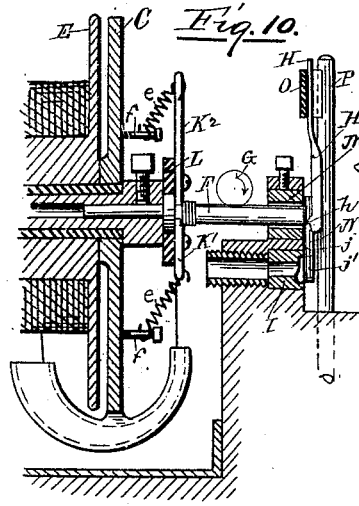
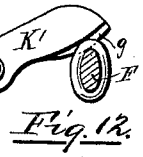
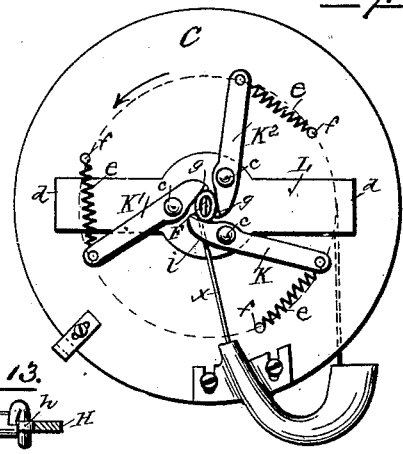
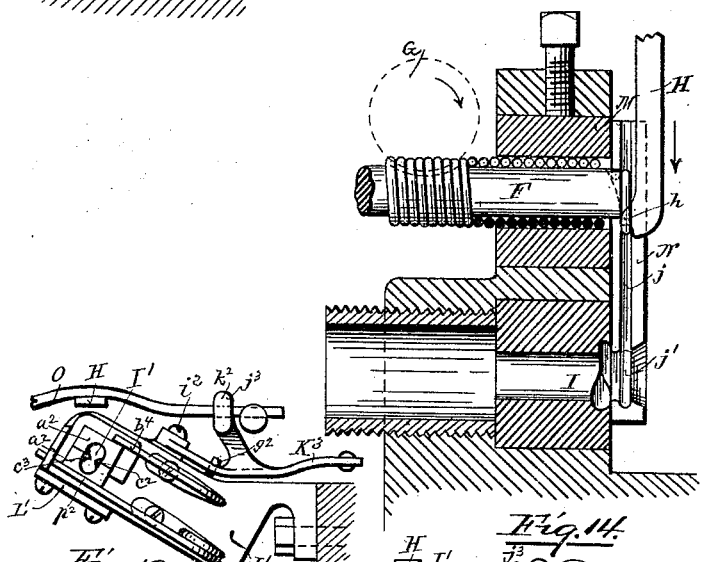
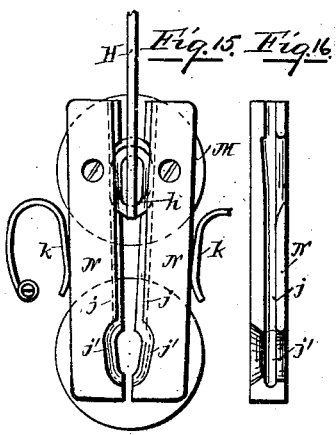
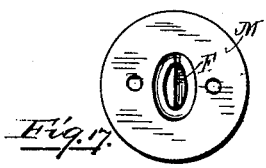
Witnesses.
Charles Hannigan
James W. Brennan
Inventors
William A. Peck
Frederick A. Peck
by S. Scholfield
Atty.

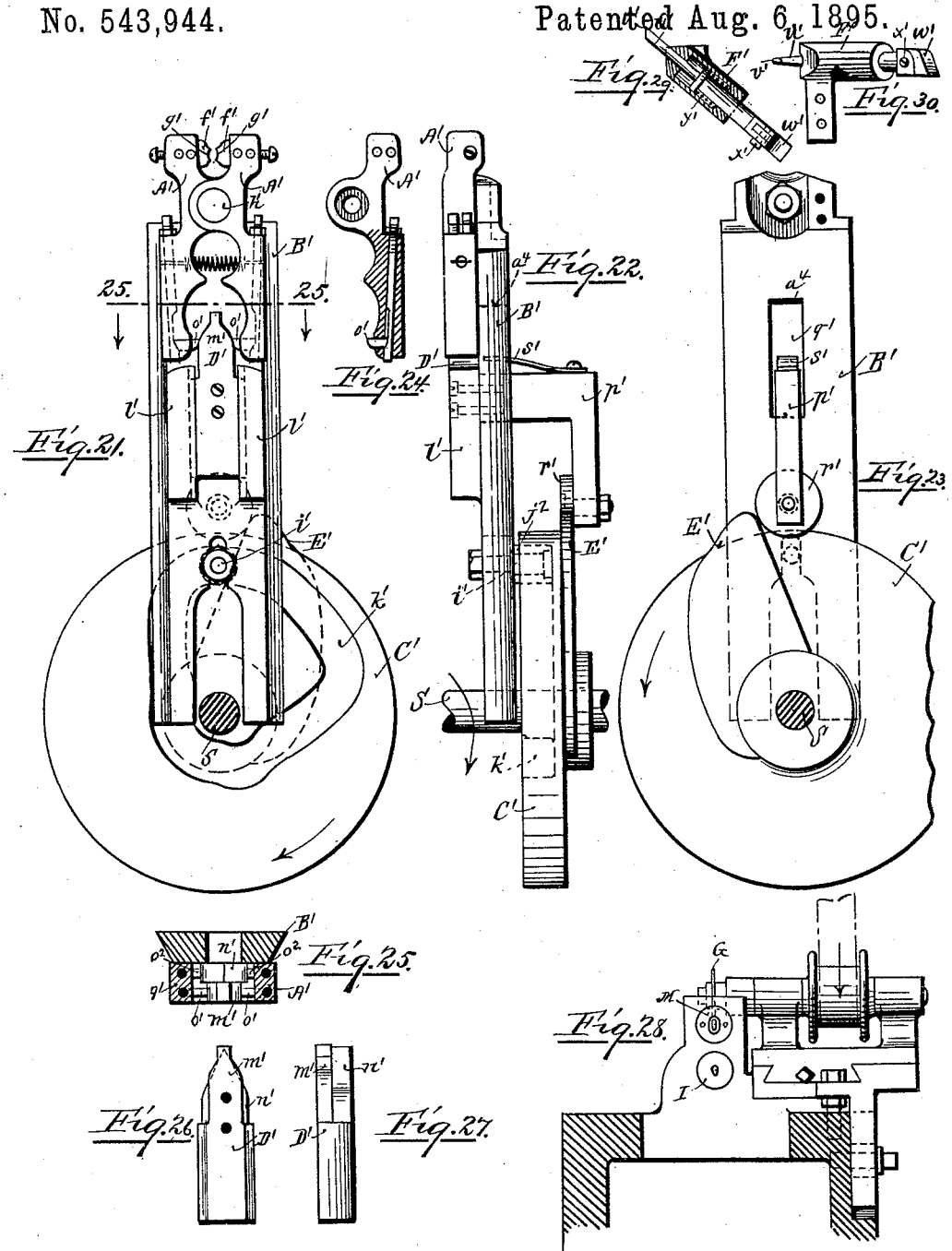

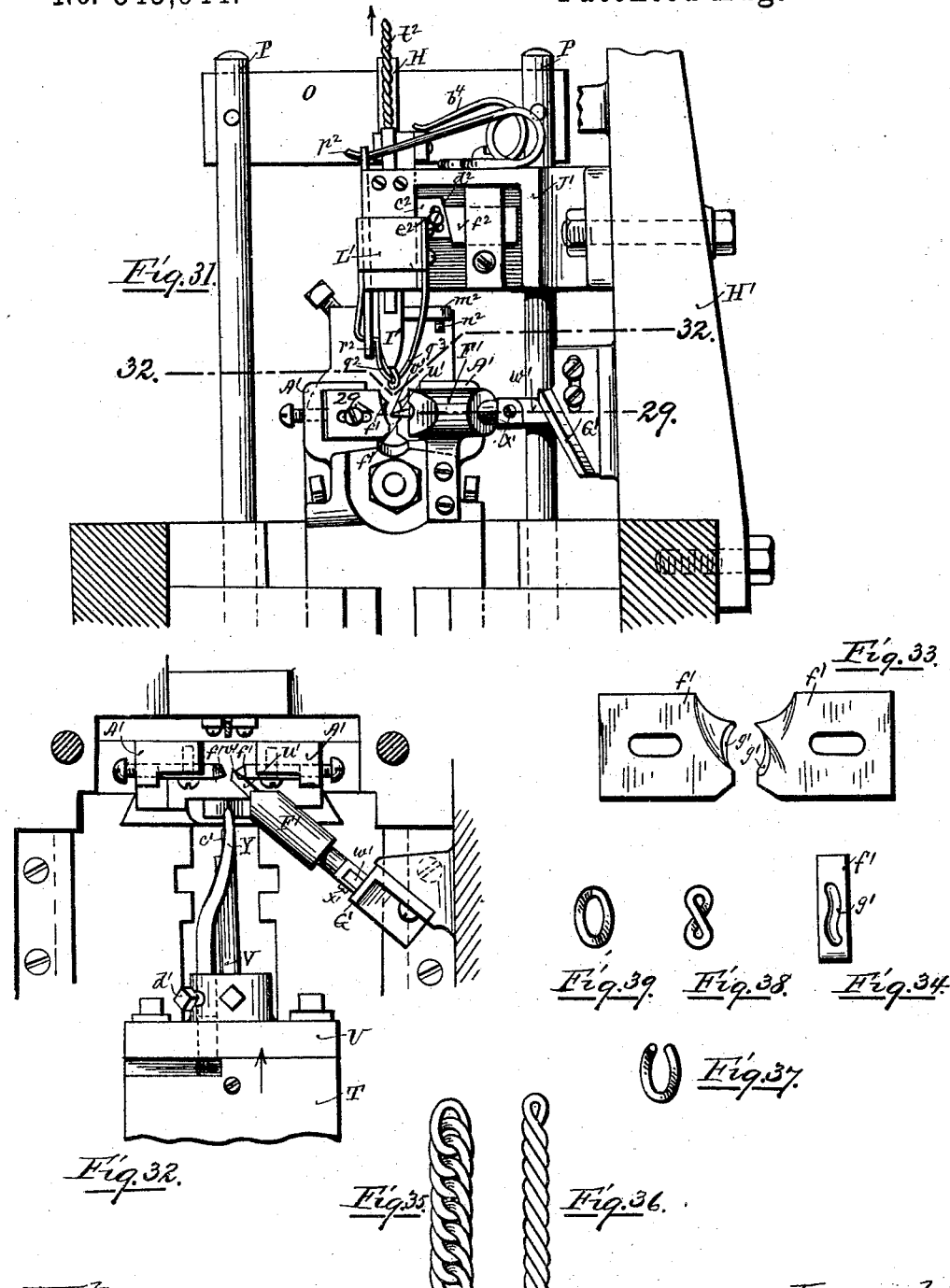

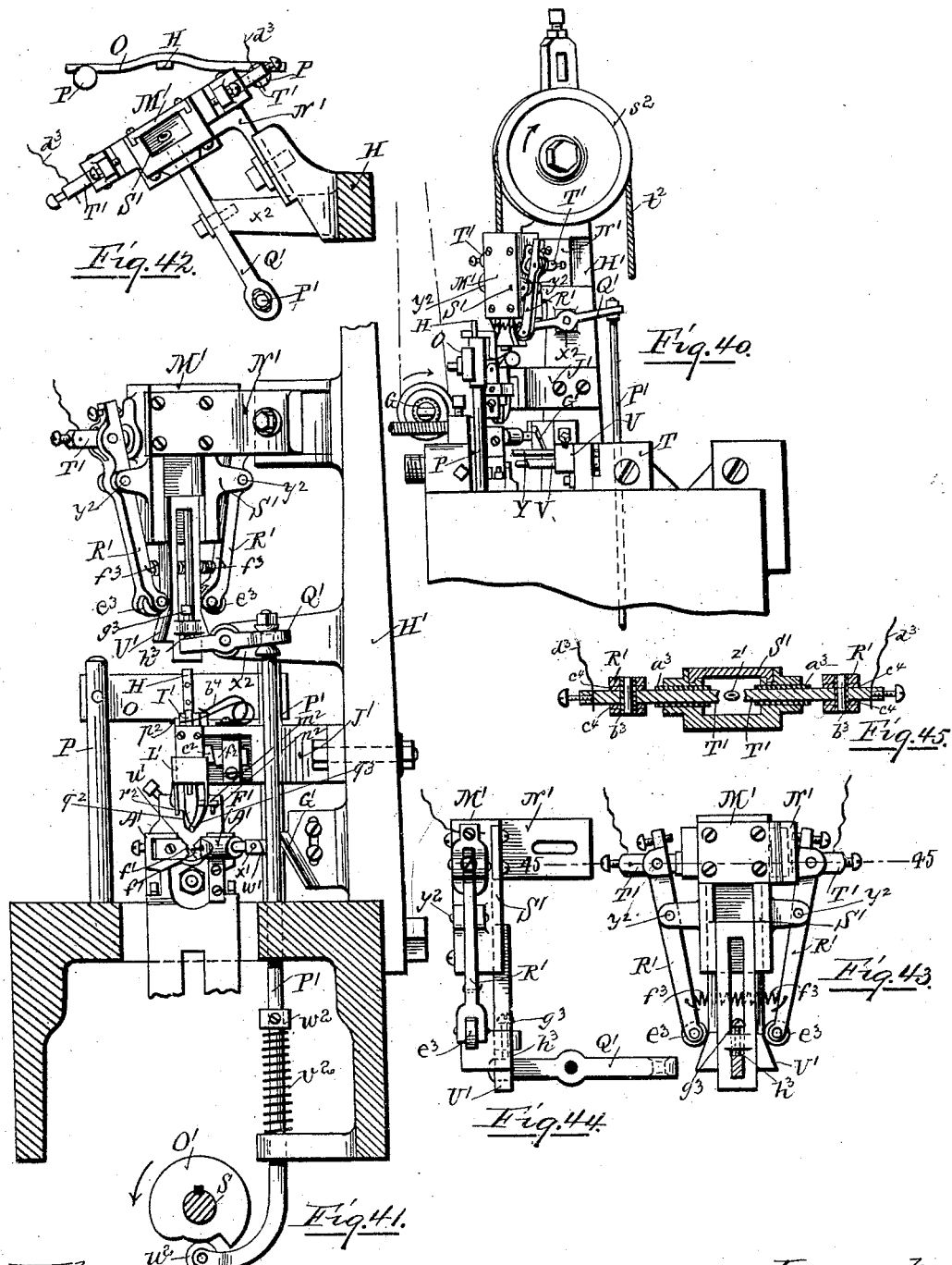

UNITED STATES PATENT OFFICE.

WILLIAM A. PECK AND FREDERICK A. PECK, OF PROVIDENCE, RHODE ISLAND; SAID FREDERICK A. PECK ASSIGNOR TO SAID WILLIAM A. PECK.

CHAIN-MACHINE.

SPECIFICATION forming part of Letters Patent No. 543,944, dated August 6, 1895.

Application filed October 27, 1892. Renewed December 31, 1894. Serial No. 533,452. (No model.)

*To all whom it may concern:*

Be it known that we, WILLIAM A. PECK and FREDERICK A. PECK, citizens of the United States, residing at Providence, in the State of Rhode Island, have invented a new and useful Improvement in Chain-Machines, of which the following is a specification.

Our invention relates to an improved machine for making curb and other ornamental chain automatically from a coil of wire, and also for welding and soldering the ends of the connected links; and it consists in the improved construction and arrangement of parts, as hereinafter fully set forth.

Figure 1 represents a side elevation of the machine. Fig. 2 represents an enlarged horizontal section of the winding-head. Fig. 3 represents an enlarged detail section taken in the plane of the axis of the driving-shaft, showing the swaging and chain-linking mechanism with the linking-jaws in their upper position. Fig. 4 represents a similar section of the linking mechanism with the linking-jaws in their lower position. Fig. 5 represents an enlarged detail section taken in the line 5 5 of Fig. 3, showing an end view of the setting-plunger. Fig. 6 represents an enlarged detail section taken in the line 6 6 of Fig. 3, showing the mechanism for conveying the link from the winding-mandrel to the swaging-dies. Fig. 7 represents a detail section taken in the line 7 7 of Fig. 6. Fig. 8 represents a detail section taken in the line 8 8 of Fig. 5. Fig. 9 represents an enlarged detail section taken in the line 9 9 of Fig. 8. Fig. 10 represents an enlarged detail section taken in the line 10 10 of Fig. 2, showing the winding-mandrel, the swaging-die, and the carrier for conveying the link from the end of the mandrel to the swaging-die. Fig. 11 represents a front view of the face-plate and the spring-actuated levers for guiding the wire upon the mandrel. Fig. 12 represents an enlarged detail front view of one of the spring-actuated levers adapted to operate upon the initial coil of the wire and a transverse section of the mandrel. Fig. 13 represents a detail view showing a wire link upon the end of the mandrel and a horizontal section of the lower end of the link-carrier which serves to remove the link from the mandrel. Fig. 14 represents an enlarged vertical section showing the mandrel, the swaging-die, the link-carrier, and one of the spring-actuated guide-bars for holding the link. Fig. 15 represents a front view of the spring-actuated pivoted guide-bars for holding the link. Fig. 16 represents an inner edge view of one of the said bars. Fig. 17 represents an end view of the mandrel and its surrounding bushing, also showing the severed links upon the mandrel. Fig. 18 represents a face view of the swaging-die. Fig. 19 represents a detail view showing the top of the longitudinally-divided guide-tube for the chain. Fig. 20 represents a detail elevation showing one of the longitudinally-grooved parts of the guide-tube and the sliding bolt for automatically locking the chain in the guide-tube, the other part of the guide-tube being removed. Fig. 21 represents an enlarged side elevation of the linking-jaws and their operating mechanism. Fig. 22 represents an edge view of the same. Fig. 23 represents a rear view of the sliding bar to which the linking-jaws are pivoted, showing also a rear view of the actuating mechanism. Fig. 24 represents a detail section of one of the jaws, showing the adjustable shoe for engagement with the sliding wedge-cam. Fig. 25 represents a transverse section taken in the line 25 25 of Fig. 21. Fig. 26 represents a face view of the sliding wedge for operating the linking-jaws. Fig. 27 represents an edge view of the same. Fig. 28 represents an enlarged sectional view taken in the line 28 28 of Figs. 1 and 2, showing the cutter for severing the coil to form the links. Fig. 29 represents a detail section taken in the line 29 of Fig. 31, showing the feed-pin. Fig. 30 represents a perspective view of the feed-pin and its holder detached from the machine. Fig. 31 represents an enlarged elevation of the linking-jaws and the guide-tube for the chain. Fig. 32 represents a sectional view taken in the line 32 32 of Fig. 31. Fig. 33 represents a side view of the opposite dies for the linking-jaws, and Fig. 34 an end view of one of the dies. Fig. 35 represents a side view, and Fig. 36 an edge view of a double-curbed chain made by the machine. Fig. 37 represents a perspective view of the link when first severed from the coil. Fig. 38 represents a face view, and Fig. 39 an edge view of the same when swaged to form the curb-link. Fig. 40 represents a perspective view of the electric welding or soldering mechanism upon the same scale as in Fig. 1, and detail side elevation of the machine. Fig. 41 represents an enlarged perspective elevation of the said mechanism and transverse section of the bed-frame of the machine. Fig. 42 represents a detail top view of the said mechanism. Fig. 43 represents a side elevation of the electric welding or soldering apparatus. Fig. 44 represents an edge elevation of the same. Fig. 45 represents an enlarged section taken in the line 45 45 of Fig. 43.

In the accompanying drawings, Figs. 1 and 2, A represents the bed-frame of the machine, at one end of which is placed the revolving hollow spindle B, provided at its forward end with the face-plate C and at its middle portion with the cone-pulleys D. Upon the forward portion of the spindle B and back of the face-plate C is placed the frictionally-held reel E, from which the wire, after passing through the curved guide $c'$, attached to the edge of the face-plate C, is wound onto the stationary mandrel F and forced along the same under the revolving cutter G, by means of which the coiled wire is divided into separately-formed links, which at the end of the mandrel F are carried downward, by means of the carrier H, to the swaging-die I, where the links are opened out and brought into the desired form by means of the swaging-plunger J, the face $a$ of the said plunger and the corresponding face of the die being made to impart the desired form to the link, and the projecting stem $b$ being employed to open out the link to the proper degree to pass over the wire of the previously-prepared link or links of the chain, the above-described mechanism having been claimed in Letters Patent No. 367,923, dated August 9, 1887, to which reference is made for a more complete description.

In order to wind the wire from the reel E tightly upon a mandrel F, of elongated cross-section, and to force the same from the mandrel, we employ the spring-actuated levers K $K' K^2$, which are pivoted at the points $c$ to the plate L, which is secured by its opposite ends $d$ $d$ to the face-plate C, the actuating-springs $e$ $e$ $e$ being attached to the outer ends of the said levers and to the pins $f$ $f$ $f$ in the face-plate; and the bearing-edge $g$ of the levers $K' K^2$ is beveled to press behind the initial coil of wire upon the mandrel, as shown in Figs. 10 and 11, a slot $i$ being made through the thinnest lever K for the passage of the wire $x$, and the levers $K'$ and $K^2$ being made of gradually-increasing thickness.

The carrier H, which serves to carry the end link from the mandrel F to the swaging-die I, is provided with a projecting lip $h$, which engages with the lower end or portion of the link, as shown in Figs. 13 and 14. To the bushing M, which surrounds the mandrel, are pivoted the guide-bars N N, provided with the longitudinal grooves $j$ $j$ and the notches $j'$ $j'$, which are adapted to clasp the edge of the link and hold the same in front of the swaging-die I, the said guide-bars being pressed toward each other to firmly hold the link, by means of the side springs $k$ $k$, as shown in Fig. 15. The carrier H is attached to the bridge O, which connects the upper ends of the rods P P, the said rods being made to slide loosely through openings $l$ $l$ made in the flange of the bed-frame A, as shown in Figs. 6 and 7, and the lower ends of the rods P P are joined by means of the cross-head Q, provided with the stud $m$, which enters the groove $n$ of the cam R, secured to the shaft S, the said shaft being driven from the cone-pulley D by means of the gear $o$ upon the cone-pulley, the gear $p$ upon the shaft S, and the intermediate gear $q$. To the reciprocating head T is secured the tool-holder U, which is adapted to receive and hold the shank of the swaging-plunger J, the said shank being provided with a screw-thread $r$ and with a groove $s$, adapted to receive the point of the screw $t$, to prevent the turning of the swaging-plunger, and within the chamber $u$, formed between the tool-holder U and the head T, is placed the nut $v$, which serves to adjust the position of the forward end of the swaging-plunger with reference to the face of the swaging-die I. The head T is operated from the shaft S by means of the cam W, the slotted bar X, which is provided with a stud $w$, having a friction-roller $y$, adapted to enter the groove $z$ of the cam, the link $a'$, and the toggle levers $b'$ $b'$, the one jointed to the frame A and the other to the reciprocating head T. When the link has been brought from the end of the mandrel F down to the holding-notches $j'$ $j'$ of the pivoted guide-bars N N, and the reciprocating head T advances toward the swaging-die, the stem $b$ of the swaging-plunger engages the opening of the link before the opening finger Y engages with the guide-bars N N to release the link from the said bars. The opener Y is attached to the tool-holder U by means of the screw $d'$, which passes through a slot $e'$ in the shank of the opener Y, so that the slack movement thus provided for the opener Y will serve to keep the guides open while the swaging-plunger recedes from the die and brings the swaged link with it to a position between the linking-dies $f'$ $f'$, which are adjustably attached to the upper end of the linking-jaws $A'$ $A'$, the said dies being provided with the curved and hollowed bearing-faces $g'$ $g'$, adapted to fit the edges of the swaged link, and the said jaws $A'$ $A'$ are jointed to each other by means of the pivot-bolt $h'$, and attached by means of the said pivot-bolt to the sliding bar $B'$, the said sliding bar being operated in its up and down movement by means of the stud $i'$ and the roller $j^2$, which enters the groove $k'$ of the cam $C'$ upon the shaft S, and upon the side of the sliding bar $B'$ are placed the guide-pieces $l'$ $l'$, which serve to guide the movement of the sliding wedge-shaped cam D' for operating the jaws A' A', the said wedge-cam being provided with two operating portions $m'$ and $n'$, the first of which, by operating upon the inwardly-projecting shoes $o'$ $o'$, serves to close the jaws upon the link when held upon the stem $b$ of the swaging-plunger and the other to close the jaws to bring the ends of the link together in the finished chain by operating upon the shoes $o^2$ $o^2$, and the wedge-shaped cam D' is attached to the angular arm $p'$, which passes through a slot $q'$ in the sliding bar B', and is provided with a friction-roller $r'$, which engages with the cam E', secured to the back of the cam C', and the wedge-shaped cam D' is forced backward by means of the spring $s'$, which enters the slot $q'$ of the sliding bar and engages with the end $a^4$ of the said slot. To the top of the sliding bar B' is attached the inclined holder F', in which is placed the sliding feed-pin $u'$, provided with the pointed end $v'$, which is adapted to enter the space within the link, and with the head $w'$ pivoted to the feed-pin $u'$ by means of the screw $x'$, and adapted for engagement with the fixed inclined cam G' attached to the upright standard H', and the said feed-pin is carried backward from its engagement with the link by means of the spiral spring $y'$.

The completed chain is held in the guide-tube I', which is made of two grooved pieces $a^2$ $a^2$, secured together and adapted to slide in a holding bracket J', which is attached to the standard H', the spring $b^4$ serving to hold the guide-tube I' at its lower position against a suitable stop-shoulder.

The two grooved bars $a^2$ $a^2$ which form the guide-tube are cut away at $b^2$ $b^2$ in order to form a slot adapted to receive the opposite holding-jaws $c^2$ $c^3$, which are held in a fixed position relatively to the up and down movement of the guide-tube I'. The jaw $c^2$ is provided with an inclined rear end $d^2$ and an inclined slot $e^2$, and is adjustably secured to the sliding bar $f^2$, provided with a pin $g^2$, which enters the cam-slot $h^2$ in the cam-lever K³, pivoted to the bracket J' by means of the screw-stud $i^2$, the said lever K³ having an upwardly-extending arm $j^3$, provided with a lip $k^2$, projecting over the bridge O, so that at the extreme upward movement of the said bridge its engagement with the lip $k^2$ will cause the upward movement of the lever K³, against the downward action of the spring $l^2$ and the withdrawal of the jaw $c^2$, to release the chain for feeding upward through the guide-tube, and upon the initial downward movement of the bridge O the chain will be again clasped between the jaws $c^2$ $c^3$ and held stationary, as before.

One of the parts of the guide-tube I' is provided with a projecting arm $m^2$, in which is placed an adjusting-screw $n^2$, and upon the upward movement of the closing-jaws A' A' one of the said jaws will strike the screw $n^2$ and thus cause the upward movement of the guide-tube, the chain being elevated with the tube by its friction with the sides of the tube and the engagement of the feed-pin with the lower link of the chain. The sliding guide I' is held in its downward position by means of the spring $p^2$, attached to the bracket J', and is provided with the opposite spring-fingers $q^2$ $q^3$, which serve to hold the lower link of the chain in position for the proper insertion of the same into the opening of the link, which is held in the closing dies $f'$ $f'$ of the jaws A' A', and as the jaws continue to ascend the spring-fingers will be carried upward out of the way of the subsequent closing action of the jaws by means of the engagement of one of the jaws with the bar $r^2$ of the sliding guide I'.

When the chain is to be made with soldered links, we attach an electric welding or soldering apparatus M' to the inclined bracket N', attached to the standard H', and to the upper end of the standard H' is attached the grooved sheave $s^2$, over which the finished chain $t^2$ will pass to a place of deposit.

The electric welding or soldering apparatus M' is constructed and operated as follows: Upon the shaft S is placed the cam O', arranged to act upon a roller $u^2$ at the lower end of the sliding rod P', which is held in its elevated position against the downward action of the cam by means of the spiral spring $v^2$ and the adjustable collar $w^2$. The upper end of the rod P' is jointed to the lever Q', which is pivoted to the arm $x^2$ of the standard H', and to the opposite end of the lever Q' is jointed the sliding cam U', serving to actuate the opposite levers R' R', which are pivoted to the holding-frame S' at the point $y^2$, the said levers being also jointed at their upper ends to the sliding contact-pins T' T', which are held to slide in the insulating bushings $a^3$ $a^3$, being also insulated from the levers R' R' by means of the insulating bushings $b^3$ $b^3$ and the side washers $c^4$ $c^4$. Electric-circuit wires $d^3$ $d^3$ are attached to the insulated contact-pins T' T', so that upon closing the ends of the same upon a link $z'$ of the chain, the heat developed by the current at the closed end of the link will serve to weld the same, and as the chain passes upward from the guide-tube I' the links will be successively subjected to the action of the electric circuit through the closing action of the contact-rods at each rotation of the cam O'. The levers R' R' are provided at their lower ends with the friction-rollers $e^3$ $e^3$, which are held in contact with the wedge-formed sliding cam U' by means of the spiral springs $f^3$ $f^3$. The movement of the contact-pins T' T' may be varied to provide for welding links of different sizes by means of the adjusting-screw $g^3$, which provides more or less play at the joint $h^3$ between the lever Q' and the sliding cam U'.

The operation of the machine will be as follows: Upon starting the machine the wire will be wound from the reel E onto the mandrel F, and will be pressed against the said mandrel and forced along on the same to the cutter G by means of the levers K K' K², and the separated spiral links so formed will be conveyed by the downward movement of the carrier H along the grooves $j$ of the guide-bars N N to the holding-notches $j'\ j'$ in front of the swaging-die I. The reciprocating head T, which carries the swaging-plunger J, will then come forward and the stem $b$ of the swaging-plunger will first enter the opening of the link, and then the tapering finger Y will enter the opening between the guide-bars N N to open the same, so as to free the link from the notches $j'\ j'$, and allow the swaging-plunger J to pass forward to swage the link to proper form against the swaging-die, after which the swaging-plunger will be retracted from the swaging-die, with the swaged link held upon the stem $b$ of the plunger, and upon the arrival of the said plunger to the position shown in Fig. 4 the plunger will come to a rest and the linking-jaws A' A' will seize the link upon the stem $b$, and upon the seizure of the link the swaging-plunger J resumes its backward movement, the guide-bars N N being retained in their opened position by reason of the backlash caused by the slot $e'$, until after the link has passed beyond their range of movement, and upon the subsequent upward movement of the jaws A' A' the link will be carried to the attaching end of the chain $t^2$, and at the same time the feed-pin $u'$ will be pressed forward into the opening of the link held in the ascending jaws and will engage with the edge of the lower link of the chain $t^2$, which is being held in proper line by means of the spring-fingers $q^2\ q^3$. The linking-jaws A' A' are then closed to bring the ends of the open link together to link the same with the chain, and the continued upward movement of the jaws will serve to cause the proper upward feeding of the chain, which will be seized at its upwardly-fed position by means of the jaws $e^2\ e^3$ and held until the like attachment thereto of the succeeding link of the chain, and as the chain is being fed upward, link by link, the electric-contact pins $t'\ t'$ will be brought against the sides of a link to produce the required welding or attachment of the abutting ends of the link to each other.

We claim as our invention—

1. In a machine for making chain-links, the combination with the cutter, and the stationary mandrel, the revolving spindle, the reel held upon the spindle, and the face-plate, of the spring-actuated levers attached to the face plate, and adapted to hold the wire against the mandrel, and to force the coils forward to the cutter, substantially as described.

2. In a machine for making chain-links, the combination with the cutter, the stationary mandrel, the swaging-die and plunger, of the grooved and notched guide-bars, and the carrier, for conveying the severed link from the end of the mandrel, to the holding notch of the guide-bars, in front of the swaging-die, substantially as described.

3. In a machine for making chain-links, the combination with the cutter, the stationary mandrel, the swaging-die and plunger, of the grooved and notched guide-bars, the carrier for conveying the severed link from the end of the mandrel, to the holding notch of the guide-bars in front of the swaging-dies, and the finger for opening the guide-bars to release the link, substantially as described.

4. In a machine for making chain, the combination with the swaging-die and plunger, of the linking-jaws, adapted to seize the link upon the stem of the swaging-plunger, and means for withdrawing the said stem from the seized link, substantially as described.

5. In a machine for making chain, the combination with the swaging-die and plunger, and a suitable guide for the chain, of the linking-jaws adapted to seize the link upon the stem of the swaging-plunger, means for withdrawing the said stem from the seized link, and means for conveying the link to the end of the chain held in the guide and for bringing the jaws together, substantially as described.

6. In a machine for making chain, the combination with the swaging-die and plunger, and a suitable guide for the chain, of the linking-jaws, pivotally held upon a sliding bar, the cam for operating the sliding bar, a sliding wedge shaped cam, for operating the jaws, to seize the link upon the stem of the swaging-plunger, and to close the link in the chain, means for moving the said stem from the seized link, and the rotary cam for operating the wedge shaped cam to open and close the jaws, substantially as described.

7. In a machine for making chain, the combination with the swaging-die and plunger, and a suitable guide for the chain, of the linking-jaws, pivotally held upon a sliding-bar, the cam for operating the sliding-bar, the sliding wedge-shaped cam provided with the two operating portions, the adjustable shoes for engaging the said cam portions, and the rotary cam for operating the wedge-shaped cam, substantially as described.

8. In a machine for making chain, the combination with the chain guide, and the linking jaws adapted to close the link to the chain, of the feed pin adapted to enter the space within the link to be closed, and carry the end links of the chain upward with the guide, substantially as described.

9. In a machine for making chain, the combination with the chain guide, and the linking jaws adapted to close the link to the chain, of the feed pin provided with the pivoted head, and the actuating spring, and the inclined cam for imparting forward and backward movement to the feed pin, substantially as described.

10. In a machine for making chain, the combination with the linking jaws, and the feed pin, of the chain guide adapted for a slight upward and downward movement with the linking jaws, and the holding jaws, adapted to clamp the chain, upon the downward movement of the guide, substantially as described.

11. In a machine for making chain, the combination with the linking jaws, and the feed pin, of the chain guide adapted for a slight upward and downward movement with the linking jaws, the holding jaws adapted to clamp the chain upon the downward movement of the guide, and the spring fingers which serve to hold the lower link of the chain in proper position for engagement, substantially as described.

12. In a machine for making chain, the combination with the automatic chain linking mechanism, of the insulated electric contact pins, and means for operating the same automatically, substantially as described.

WILLIAM A. PECK.
FREDERICK A. PECK.

Witnesses:
SOCRATES SCHOLFIELD,
JAMES W. BEAMAN.